A. G. MEAD & C. J. ADDY.
STAMPING PRESS.
No. 76,647.   Patented Apr. 14, 1868.
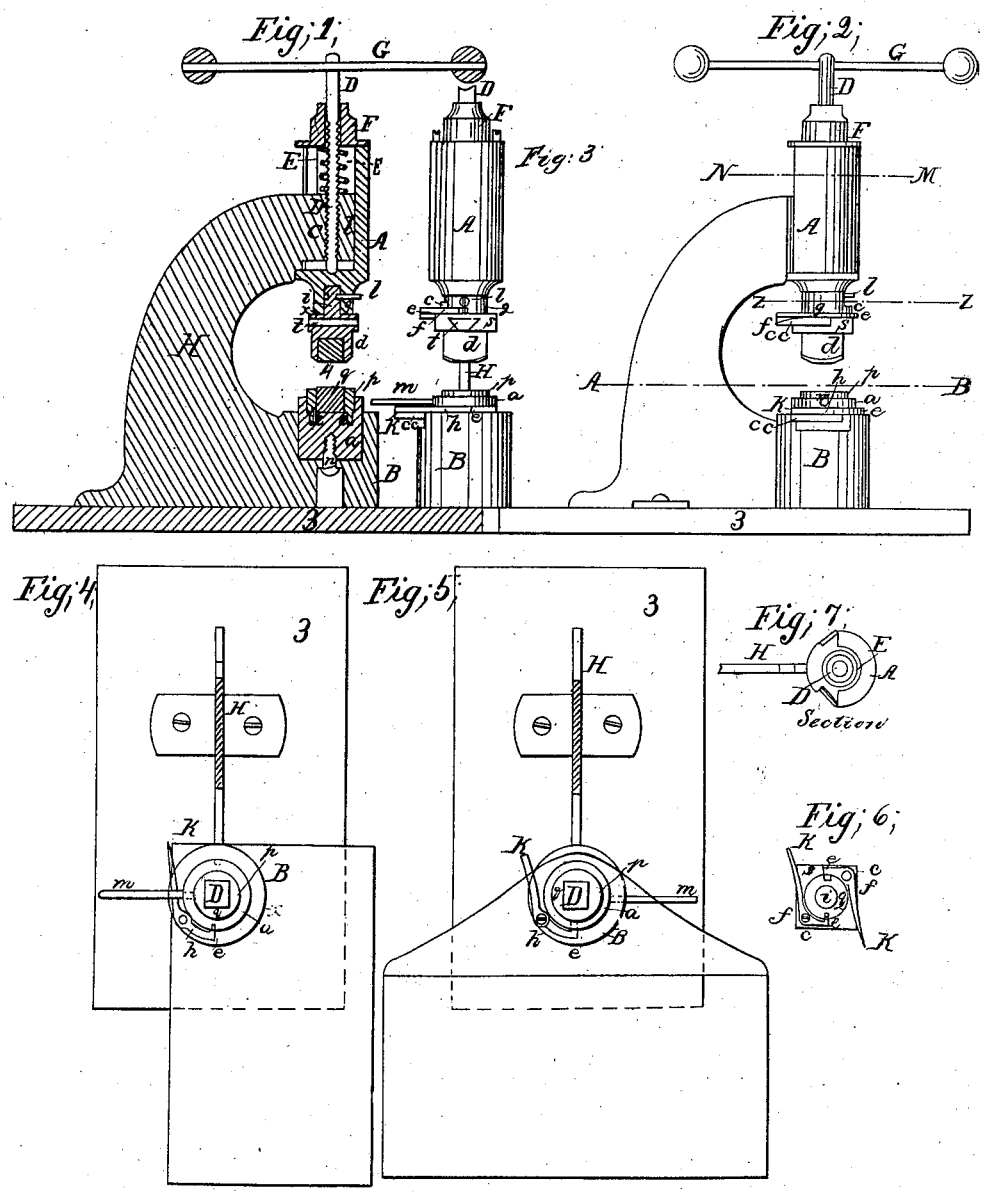

United States Patent Office.

ALBERT G. MEAD AND CHARLES J. ADDY, OF BOSTON, MASSACHUSETTS.

Letters Patent No. 76,647, dated April 14, 1868.

IMPROVEMENT IN STAMPING-PRESSES.

The Schedule referred to in these Letters Patent and making part of the same.

TO ALL WHOM IT MAY CONCERN:

Be it known that we, ALBERT G. MEAD and CHARLES J. ADDY, both of Boston, in the county of Suffolk, and State of Massachusetts, have invented certain new and useful Improvements in the Stamping-Presses which are used for stamping or embossing paper or other substances, of which the following is a full, clear, and exact description, reference being had to the accompanying drawings, making part of this specification, in which—

Figure 1 is a longitudinal vertical central section.

Figure 2, a side elevation.

Figure 3, a front view, minus the bed-piece Z.

Figures 4 and 5 are horizontal plane sections on the line A B of fig. 2.

Figure 6 is a horizontal plane section on the line Y Z of fig. 2.

Figure 7, a similar section on the line M N thereof.

Our invention consists in the employment of a swivel-step, $a$, which is seated in the annular base B of the press, in combination with a swivel-die chuck, $d$, connected with the lower end of the slide A, or to the stem $g$ thereof; also in the employment of a dog, $f$, applied to the chuck $d$, by means of a screw or a pivot, $c$, to engage with the stem of the slide, the hook-end $e$ of said dog entering a socket made in each side of the stem $g$, to prevent the slide turning when set for operation; also in the employment of a similar dog, $h$, applied to the top of the base, B, to engage with the swivel-step $a$, in the same or in a similar manner; and for the same purpose springs $c\ c$ are attached to the lever portion $k$ of each of the dogs, to throw them into contact with their holding-seats.

The centre or pintle, $i$, of the chuck $d$, enters the lower end of the stem of the slide, and is held up by a screw or a pin, $l$, passing through one side of the stem $g$, into an annular groove made in the pintle $i$, near its upper end, or between the shoulder $x$ and the end of the pintle. The step $a$ may be secured by the same means, or by a screw, $n$, passing upward from the chambered base into the lower end of the step. A bar or lever, $m$, provides for turning or swivelling the step $a$, and the chuck $d$ may be turned or swivelled by pressing on the lever-end of the dog $f$, which releases the hook-end of the dog from its holding-socket, and turns the chuck around when desired. A movable counter-block, $p$, is set into the top of the swivel-step, and the counter $q$ is fitted into said block, the bottom resting on the step $a$. The counter-block is connected with the step by one or more steady-pins, $r$, projecting downward from the under side of the block, and entering holes in the upper side of the step. The lower portion of the swivel-chuck $d$ may be connected with the upper portion, $s$, thereof, by a horizontal dove-tail, $t$, formed in one with the lower portion, and made to slide into the lock, made in the upper part to receive it. This dove-tail makes the chuck reversible without the swivel-adjustment.

The slide A is fitted on to the head C of the stand, as shown in fig. 7, and is moved vertically downward by a screw, D, passing through the head C of the stand, the lower end of the screw having a step in the lower part of the slide, above the stem $g$. A spiral spring, E, is arranged around the screw D, between the top of the head C of the stand and the under side of the cap F of the slide, to move the latter upward when the screw is turned backward, and upward to raise the slide and the swivel-chuck $d$. Any other convenient device may be arranged to perform the office of the spiral spring. A bar or handle, G, connected with the top of the screw, is for turning the latter in either direction.

Our invention is designed for stamping or embossing the medallions or other figures on the corners of note-paper or letter-paper, and for stamping or embossing the same or similar figures, or the monograms, on the flap or fly of envelopes. The outlines of a small sheet of note-paper are seen in fig. 4, and the outlines of an envelope are seen in fig. 5, and both in position on the counter $q$ to receive an impression.

It will be understood that the figure or the monogram stamped on the corner of the note-paper is, to use the common expression, right side up, but the figure or the monogram stamped on the fly of the envelope must be bottom side up, in order to have it properly readable when the fly of the envelope is folded over.

The stamping of the figures on the envelopes could be done by turning the envelope around, the opposite side towards the operator, who should stand or sit in front of the press. But to make room for the envelope back of the counter, the stand H of the press would have to be deeper, or extended back considerably, which would necessitate a much heavier and stronger stand, and consequently a much more expensive press.

By providing the swivel-step and the reversible or swivel-chuck, the figures or the monograms may be impressed in or raised on the paper or other suitable substance, either side up, and with ease, facility, and economy, and with a much lighter and less expensive press. The lighter the press, the easier and more rapidly it may be operated, consequently, the greater the amount of work performed in a given time.

It will be understood that the swivel-chuck has a socket in its lower end, to receive an impression-die, 4, the face or lower end of which contains the figures to be impressed on the paper or other substance, and the counter $q$ being leather or gutta percha, or other similar and suitable substance, yields to the pressure of the die, and leaves the impression in or on the substance pressed or stamped, as in the ordinary stamping-press.

In fig. 4, the swivel-step and the counters are right side up, or the impression is readable from the front of the press. In fig. 5, the swivel-step and the counter are shown as turned round half way, to bring the impression bottom side up, or readable by folding the fly of the envelope down, and by turning the envelope over endways, to a position usually held, to read the monogram. In fig. 6, the swivel-chuck is shown in two positions, either of which positions may be understood by the dog $f$ on either side of the figure, the lever-end $k$ of each pointing in opposite directions.

Our improvements may be readily applied to almost any stamping or embossing-press, or presses intended for other purposes, and be made available and very useful in such presses, and whether such press is for stamping in ornamental design for artistic effect, or for any other kind of stamping or punching. A smaller and lighter press may be made to stamp or punch in, on, or through much larger articles or pieces than where the counter and step and the die-chuck are stationary, or set for a vertical motion, without the swivelling or reversible adjustment.

What we claim as new, and desire to secure by Letters Patent, is—

1. The reversible swivel-step $a$, in combination with the reversible or swivel-chuck $d$, for the purpose and substantially as described.

2. The slide A and screw D, and spiral spring E, or equivalent, when combined with the head C of the stand, for the purpose and substantially as described.

ALBERT G. MEAD,
CHARLES J. ADDY.

Witnesses:
J. B. SAMUELS,
JOHN E. CRANE.